United States Patent [19]

Vervliet

[11] 4,269,344
[45] May 26, 1981

[54] PRESSURE WELDING METAL BARS TOGETHER

[75] Inventor: Rene Vervliet, Hemiksem, Belgium

[73] Assignee: Societe Franco-Belge des Laminoirs et Trefileries d'Anvers "Lamitref", Hemiksem, Belgium

[21] Appl. No.: 958,577

[22] Filed: Nov. 7, 1978

Related U.S. Application Data

[63] Continuation-in-part of Ser. No. 907,743, May 19, 1978, abandoned.

[30] Foreign Application Priority Data

May 24, 1977 [GB] United Kingdom ............... 21907/77

[51] Int. Cl.³ .................... B23K 20/02; B21C 1/18; B21B 15/00
[52] U.S. Cl. .................................. 228/125; 228/158; 228/170; 228/265
[58] Field of Search ............... 228/125, 156, 158, 170, 228/265; 219/57, 58

[56] References Cited

U.S. PATENT DOCUMENTS

| | | | |
|---|---|---|---|
| 3,259,969 | 7/1966 | Tessmann | 228/125 |
| 3,451,123 | 1/1969 | Fredriksson et al. | 228/170 |
| 3,469,302 | 9/1969 | Anders et al. | 228/125 |
| 3,828,601 | 8/1974 | Tessmann | 228/125 X |
| 3,934,784 | 1/1976 | Tessmann | 228/125 |
| 4,018,376 | 4/1977 | Capetti | 228/170 X |
| 4,094,453 | 6/1978 | Cook et al. | 228/265 |

FOREIGN PATENT DOCUMENTS

| | | |
|---|---|---|
| 2018921 | 11/1971 | Fed. Rep. of Germany . |
| 1591811 | 6/1970 | France . |
| 302622 | 1/1955 | Sweden . |
| 23026 | 7/1944 | United Kingdom . |
| 182805 | 12/1966 | U.S.S.R. . |

*Primary Examiner*—Gil Weidenfeld
*Assistant Examiner*—Kenneth J. Ramsey
*Attorney, Agent, or Firm*—Edward J. Brenner

[57] ABSTRACT

A process for pressure welding two metal bars together by their ends which comprises bringing together the ends to be welded, the ends being in a wedge-shaped form and at a temperature between melting temperature and 450° C. below the melting temperature, pressing both ends together in the longitudinal direction of the bars so that the ends penetrate into each other, with the edges of the wedges in crossing relationship, and continuing to press both ends into each other until substantially all of the surface material of both wedges is expelled out of the cross-sectional shape of the welded bars.

12 Claims, 6 Drawing Figures

PRESSURE WELDING METAL BARS TOGETHER

CROSS-REFERENCE TO RELATED APPLICATION

The present application is a continuation-in-part of applicant's copending application Ser. No. 907,743, filed May 19, 1978, now abandoned.

BACKGROUND OF THE INVENTION

The invention relates to a process for pressure welding two metal bars together by their ends, and its use in a process for continuously producing copper wire rods in an in-line plant with wire bars as starting material.

As is well-known, copper wire rods can be produced by continuous casting on a casting wheel into a continuous string which is then passed through a continuous rolling mill. The difficulty is that this system is not flexible with respect to short interruptions and changes of production speeds and changes of composition of the copper alloys. Its best use is for a continuous basic production of a given alloy composition.

However, conventional production of wire rods, in which the conventional wire bars as starting material are gradually rolled into the desired cross-section, still has the important drawback that it is a discontinuous method. This means that the system delivers one by one a number of limited lengths of wire rods which must be welded to each other into conventional coil lengths and these welds are the weak points in further wire drawing.

It is for that reason that we, in previous attempts, have tried out an in-line method, as well-known in the metal industry, for application in a process for continuously producing copper wire rods, in which process the wire bars are firstly passed at hot rolling temperature through a rolling mill for delivering one after another a number of copper bars, in which the leading end of each copper bar leaving the rolling mill is welded to the trailing end of continuous string formed by the preceding bars which are welded to each other, and where finally this continuous string is continuously rolled through a continuous rolling mill into wire rods. The output of this system produces an unlimited length of wire rods where the welds, made in an intermediate stage, have been rolled out and recrystallized and which were expected to form a better joint. The copper bars, as they left the initial rolling mill, were still at rolling temperature and, whilst at that temperature, the ends of the bars were pressed into each other over a certain distance whilst these ends were further heated up by means of an electric current passed through the contact surface.

Unfortunately, this method appeared not to be practicable for two reasons. A first reason relates to the necessary time to produce the weld. The ends of the copper bars are oxidised, even when they have been cut off just before welding in order to provide fresh unoxidised copper material for contact with the other end. The bars are hot indeed and the extremities directly oxidise again before pressing. For that reason the ends are pressed into each other over a distance, in general three to five times the diameter of the bars, sufficient to ensure that substantially all of the oxidised initial contact surface material flows outward, out of the cross-sectional shape of the bars, to form a ring around the weld, which weld is then formed inside said cross-sectional shape between fresh unexposed copper material coming from inside the bar. But this means then that the gripper of the copper bars must keep these bars so that a length of three to five times the diameter protrudes out of the gripper before pressing. When both protruding ends are then applied to each other for pressing, this results in a total length of six to ten times the bar diameter, of a very weak heated copper material, put under axial pressure. The result is that this length tends to buckle instead of flaring out and expelling the unclean surface material outward. In order to avoid this, as is known in the art, one must have recourse to a pressing operation in a plurality of steps. The grippers take the ends so as to only protrude by up to one and a half times the diameter, the ends are pressed into each other over a length of up to once the diameter, then the grippers release the extremities and grip them again at a point a bit further from the joint press again both extremities further into each other over a further length and so on until a sufficient total length of both extremities are pressed into each other to be sure that no substantial amount of the oxidised surface is remaining inside the cross-sectional shape of the copper bars. Thus no more than three times the diameter of the bars has then ever been exposed to buckling load.

But a practical system for delivering up to 20 tons of wire rods per hour must be able to treat one wire bar, or to conduct one welding cycle, every 22 seconds. Such a cycle requires at least the steps of gripping both ends and bolting both grippers, pressing both ends against each other, unbolting both grippers and releasing both ends, and evacuation and translation of the bars into the position for the next weld. So, it is a practical inevitable necessity that the weld is conducted by a single pressing operation and not by two or more successive pressing steps. However, only in this latter case, is the danger of buckling sufficiently removed.

The second difficulty which makes the method hardly practicable relates to the quality of the weld and of the joint after the weld has been rolled out in the next continuous rolling operation. It appears to comprise a number of microcracks caused by rolling the welding zone.

SUMMARY OF THE INVENTION

The invention provides a process for pressure welding two bars by their ends in a way which reduces the danger of buckling during the pressure operation. This process is useful for pressure welding any two metal bars together by their ends, because it will reduce the number of pressing steps necessary to obtain a weld without danger of buckling, or, if one step only is used, it will reduce the danger of buckling.

The method according to the invention is particularly useful in an in-line method for continuously producing copper wire rods, when starting from wire-bars, as explained above. It allows a real pressure weld to be obtained in one simple pressing step. This constitutes the preferred use of the process according to the invention.

According to the invention, there is provided a process for pressure welding two metal bars together by their ends, comprising bringing together the ends to be welded, said ends being in a wedge-shaped form and at a temperature between melting temperature and two hundred degrees C. below the melting temperature; pressing both ends together in the longitudinal direction of the bars so that the ends penetrate into each other, with the edges of the wedges in crossing relationship, and continuing to press both ends into each other until substantially all of the surface material of both wedges is expelled out of the cross-sectional shape of the welded bars.

In the initially tried process described above for continuously producing copper wire rods in an in-line plant, the bad quality of the weld appeared to be caused by the fact that the weld was partially obtained by local melting, so that during solidification brittle eutectic regions and inhomogenities were created, so that rolling out of such inhomogeneous weld resulted in the observed microcracks. So, a weld had been obtained by pressure and heat, but not a "pressure welding," as is to be understood hereinafter as a welding, between two solid-state metal surfaces, under the mechanical action of pressure, to form a molecular cohesion. Such a weld has the advantage of producing a completely homogeneous welding region, which, after hot continuous rolling and recrystallisation presents the same metallurgical structure and mechanical characteristics as the remaining of the wire rods. But for obtaining such pressure weld, it is necessary that the melting point is never and nowhere reached in the contact surface, and it is for that reason that simultaneous heating by electrical current through the contact surface or by a flame is undesirable because it is not sufficiently controllable, and it is preferable to apply no heating at all to the welded ends during the pressure welding operation, at least no heating that would cause the copper to melt.

But then of course, with bar ends which must no longer be heated, or only in a limited and controllable way, the plastic flow of the bar ends into each other becomes less easy and the danger of buckling increases. It is for that reason that the invention, in using wedge-shapes for pressure welding, provides a real pressure welding which can be formed in one single pressing step, even at temperatures of the bar ends going as low as 450° C. below melting point. This lower limit of the temperature range for pressure welding according to the invention is, however, no absolute limit, but is given by the temperature at which the required pressure for obtaining a molecular cohesion becomes too high and exceeds the pressure at which buckling occurs, because it is then no longer useful to promote, by wedge shapes, the plastic flow before the pressure limit for buckling is reached, because then the pressure is still not sufficient to obtain a molecular cohesion. And such temperature limit depends on the exact composition and form. The necessary pressure energy is less in the upper part of this range, near to the melting point, but in the lower part the necessary heating energy is then lower, so that the preferred temperature lies in the middle of this range, between one hundred and three hundred degrees centigrade below the melting temperature, i.e., the temperature where melting occurs in the contact place.

The wedge-shaped ends considerably reduce the danger of buckling indeed. On one hand, when the two wedges start to penetrate into each other, the axial pressure forces only gradually increase from zero, at the moment of first contact, to the full value, when both wedges have totally penetrated into each other. So, the full value of pressure is only attained when the total length, submitted to buckling load, is already shortened by two times the length of the wedges, as explained hereunder. Further, the wedge-shapes also assist the oxidised surfaces to be pushed outward, and this needs a lower necessary penetration depth as when the bar ends would have been cut perpendicularly to the bar axis. As a result, the bar ends can be made to protrude out of the grippers over a shorter length and the danger of buckling is much less than with perpendicularly cut bar ends. So, for a given material and bar diameter and a given temperature, the number of successive pressing steps necessary to produce a pressure weld is much lower, and in some cases, as shown below, can be reduced to a single one.

This invention is especially useful for the application in a process for continuously producing copper wire rods in an in-line plant. This process, according to another aspect of the invention comprises passing a number of wire bars at hot rolling temperature, one by one through a rolling mill, for delivering one after another a number of copper bars; pressure welding the leading end of each copper bar leaving said rolling mill to the trailing end of a continuous string formed by the preceding bars which are welded to each other, said welding being carried out according to the invention in a single pressing step, and without any supply of heating energy to the welded extremities during the pressure welding operation, sufficient to cause any copper to melt; removing the material which has been expelled by the pressure welding out of the cross-sectional shape of the welded bars, from around the weld; and continuously rolling said continuous string through a continuous rolling mill into wire rods.

The preferred dimension of the bar is the dimension a metal bar will have for entering in a conventional continuous rolling machine, i.e. a cross-sectional surface in a range between 5 and 35 $cm^2$. It is clear that the material of both bars will preferably be the same, in order to form a string of the same material, but different materials can be used, as long as the mechanical characteristics of plastic flow of both extremities, when pressed into each other, are not too different. The "copper wire rods," which can be made by the continuous process hereabove in an in-line plant, are to be understood as wire rods of pure copper, with its inevitable impurities, or as wire rods where the copper is the principal ingredient of a copper-alloy. As a wedge-shape is preferred a dihedral angle of at least 90° sharpness and of which the edge substantially perpendicularly cuts the axis of the bar. But, in accordance with the temperature and the mechanical characteristics of the material a more obtuse angle can be taken, if not otherwise possible, up to 135° and having an edge which need not necessarily be perpendicular to the axis of the bar and cut that axis.

BRIEF DESCRIPTION OF THE DRAWINGS

The invention will be described hereunder in more detail in connection with its preferred application in an in-line plant for continuously producing copper wire rods and with reference to the accompanying drawings in which.

DESCRIPTION OF THE PREFERRED EMBODIMENTS

Figure 1:
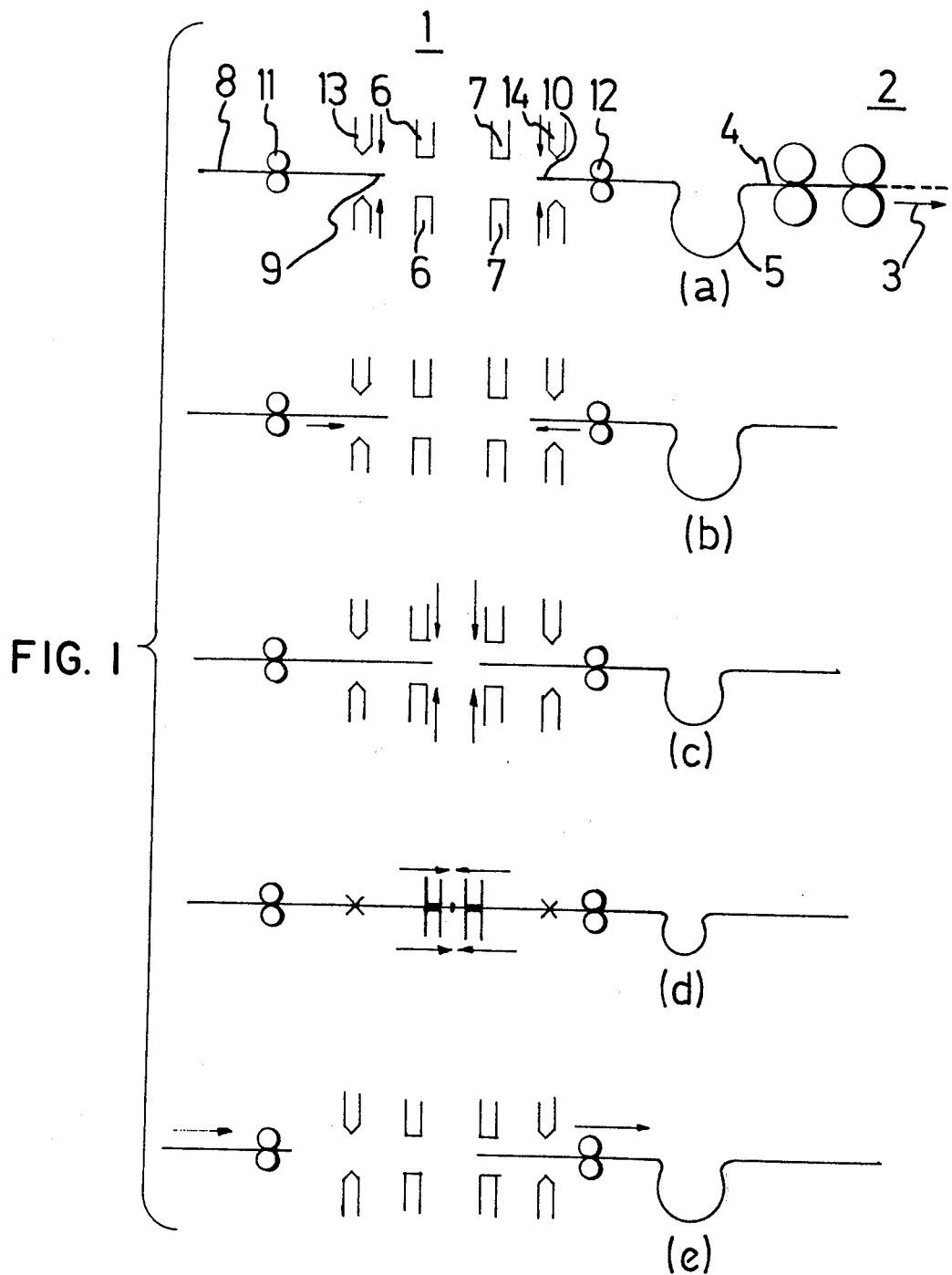
FIG. 1 shows schematically a method of welding a bar to a continuous string formed by welding bars together.

As a starting material, conventional copper wire-bars are used, which are elongated, substantially rectangular blocks. Representative dimensions are for example, length 1.37 meter, average breadth 11.1 cm, average height 11.1 cm, so that a wire-bar has a weight of about 125 to 140 kg. These wire-bars are firstly heated to a temperature of about 825° and are supplied one by one to a discontinuous rolling mill. This is a rolling mill where only one wire bar is treated at a time, by passing back and forth in a known way between a number of profiled rolls where it is reduced to a bar which, in this case, has a round cross-section of about 4 cm diameter and a length of about 13 meter. When a bar leaves the discontinuous rolling mill, a new wire-bar is released towards the entry of the discontinuous rolling mill.

The bar which leaves the discontinuous rolling mill is then led into a waiting furnace, where it waits, together with a number of precedingly rolled bar, its turn to be released towards the welding machine. In this furnace, the bar remains a sufficient time to assume through its whole body an uniform fixed temperature, which lies in the range of about 840°–860° C. This is a very reliable and controllable method to ensure that the ends of the bars are at a well-determined high temperature very close to the melting-point, without any danger of exceeding the melting temperature. When leaving the discontinuous rolling-mill, the ends are cooled down with respect to the body of the bars. If, as previously tried, these ends are heated by electrical or flame energy during the welding operation, this method is so susceptible to fluctuations of heating that one has to keep at a good distance from melting-temperature to ensure that melting will not occur, anywhere in the joint so that a real pressure-welding will be obtained. But with lower temperatures of the bar ends during welding, the danger of buckling instead of flattening and plastic flow outward is greater. In a furnace however, which can be kept at a well-determined, constant temperature, the bar can be heated up to a well-determined uniform temperature, very near to melting-point and without danger of exceeding it. If the bars are kept in the waiting-furnace for a sufficient time to allow the bars substantially to assume the temperature of the furnace, an accurate temperature level is guaranteed for the bar ends, sufficiently high to avoid to a maximum the necessity of heating the bar ends during the welding operation. It must however be well understood that the invention can be carried out independently of the way in which the bar ends have been brought to temperature, in so far as, through the use of the invention, the danger of buckling during the pressing operation is reduced. More specifically for these copper wire-bars, temperatures of 700° and 800° C. have been tried which proved satisfactory. But the waiting furnace heating method is preferred, because it reduces to a minimum the necessity of heating during the welding operation, which is also advisable for further reducing the danger of buckling, but which is dangerous for reaching the melting point and not obtain a real pressure weld. The waiting furnace can at the same time act as a buffer-furnace, to allow the discontinuous rolling mill and the welding machine to start and stop independently while the furnace can accumulate or deliver the necessary bars.

The method of further treatment of the bars, in a continuous process as preferred is schematically shown in FIG. 1. Herein 1 represents a welding machine for the bars and 2 a continuous rolling mill. The general movement of the treated material is in the sense of the arrow 3. Whereas the rolling mill works continuously at a constant speed, the welding machine works in a number of cyclically repeating steps, so that the spring 4, which is formed by the welding machine, is delivered in intermittently repeating steps. For that reason, the string 4 forms, between the welding machine and the rolling mill, a buffer loop 5, or any other accumulating form, of which the dimensions become greater or smaller according as the supply from the welding machine is greater, respectively smaller than the input demand of the rolling mill, in order to take up the instantaneous speed differences between the upstream welding machine and the downstream rolling mill. Whereas the leading end 9 of the continuous string 4 has already left the rolling mill, the trailing end 10 remains in the welding machine.

In the rolling mill 2, only the first two passes are schematically shown, but it is clear that this rolling mill may have a much greater number of passes, e.g. 10 to 20 passes, and that the necessary number of passes will be used depending on the desired final diameter which may be between 3 and 20 mm. The total reduction in this rolling mill will however at least be 75% of the initial cross-sectional area, in order to allow the joint to be sufficiently worked thermomechanically.

The welding machine 1 comprises a first gripper 6 and a second gripper 7, for gripping the bar 8 which arrives in the direction of arrow 3 at its leading end 9, and gripping the trailing end 10 of the string 4, whilst these ends are in alignment with one another. These grippers are movable in the direction of the alignment, longitudinally, and this movement is driven by a high-power system, not shown in FIG. 1, but which forms part of the welding machine and which is connected with both grippers 6 and 7 for moving them nearer to each other and further away from each other, along the line of alignment of the bars. The high-power driving system can be a hydraulic cylinder system or any other system, capable of developing the necessary force. The force needed for pressing two bars into each other depends on the cross-sectional area and the temperature at the bar ends, but at the preferred temperature of 850° C., the pressure will be about 80 kg/mm$^2$.

The path for the bar 8 in the welding machine comprises a system of rollers, schematically shown at 11, which are driven by an electric motor and which engage with the arriving bar between the rollers so as to give that bar a programmed longitudinal movement under command of the electric motor. The path for the string 4 out of the welding machine comprises a similar system of rollers, schematically shown at 12, so as to give the string a programmed longitudinal movement under command of an electric motor which drives the roller system 12.

The welding machine further comprises a first pair of shears 13, located along the path for the leading end 9 of the arriving bar 8 into the machine, and a second pair of shears 14, located along the path out of the machine for the trailing end 10 of the string 4. These pairs of shears are so shaped as to cut a piece of the said leading and trailing bar ends and to leave at both ends a wedge-shaped extremity.

The different steps of operation of the welding machines are as follows. The roller systems 11 and 12, in a first step, bring the leading end 9 of the arriving bar 8 and the trailing end 10 of the string 4 between the first pair of shears 13 and the second pair 14 respectively which are the positions shown in FIG. 1 (a). Then the shears 13 and 14 are operated for cutting these ends into wedge-shaped extremities, as shown by the vertical arrows on FIG. 1 (a). This is done by cutting off a small piece from both ends, sufficient to be sure that the irregular and unclean peaks are replaced by pure wedge-shapes. A piece of a length of about the average thickness of the bar will in general be sufficient. In the next step, the roller systems 10 and 11 are operated to move the leading extremity 9 of bar 8 and the trailing extremity 10 of string 4 in alignment towards each other, as shown by the arrows in FIG. 1b, and further within reach of grippers 6 and 7. These grippers are then operated to grip the ends 9 and 10 respectively (FIG. 1 c), and the position in which the extremities were brought by the roller systems 10 and 11 is such, that after the grippers are closed, the extremities of these ends protrude out of the grippers towards each other by a length of at least once, and at most three times the average thickness of the bars, preferably twice. The minimum length is determined for each case as a function of the necessary pressing depth to expell outward the exposed oxidised wedge-surface material and this depends on the material and the sharpness of the wedge, and the maximum allowable length is determined by the danger of buckling at the temperature used.

Then follows the next step as shown in FIG. 1 (d): both grippers 6 and 7 are moved towards each other, as shown by the arrows, over a sufficient distance to cause both protruding extremities to be pressed into each other.

After both ends 9 and 10 are pushed into each other, the roller system 12 drives the string 4, which is now extended by one bar length, in the direction of the arrow in FIG. 1 (e) out of the welding apparatus, until its new trailing end comes between the shears 14. In the meantime, the next arriving bar is driven by roller system 11 until its leading end comes between the shears 13, and the machine is then ready for the next cycle.

In order to have, after cutting by the shears, a wedge surface as clean as possible, it may be advisable firstly to clean and to descale the opposite bar surface areas where the edges of the shears come in contact with the surface of the bar just before penetrating into the bar. When these surfaces are covered with oxides there is a danger that the shears press these into the bar and that the wedge surfaces contain such oxide inclusions which have been pressed into the copper. Cleaning can be done by simply milling away a part of that surface.

Figure 2:
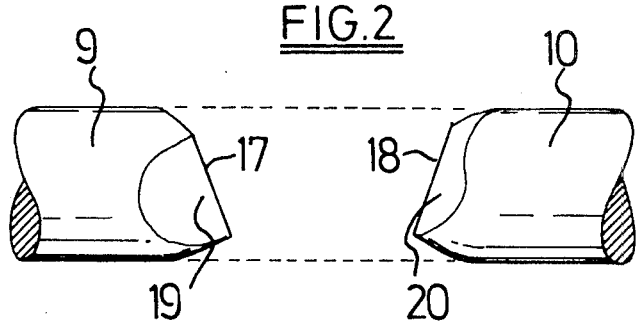
FIG. 2 shows two bar ends cut into wedge shapes.
Figure 3:
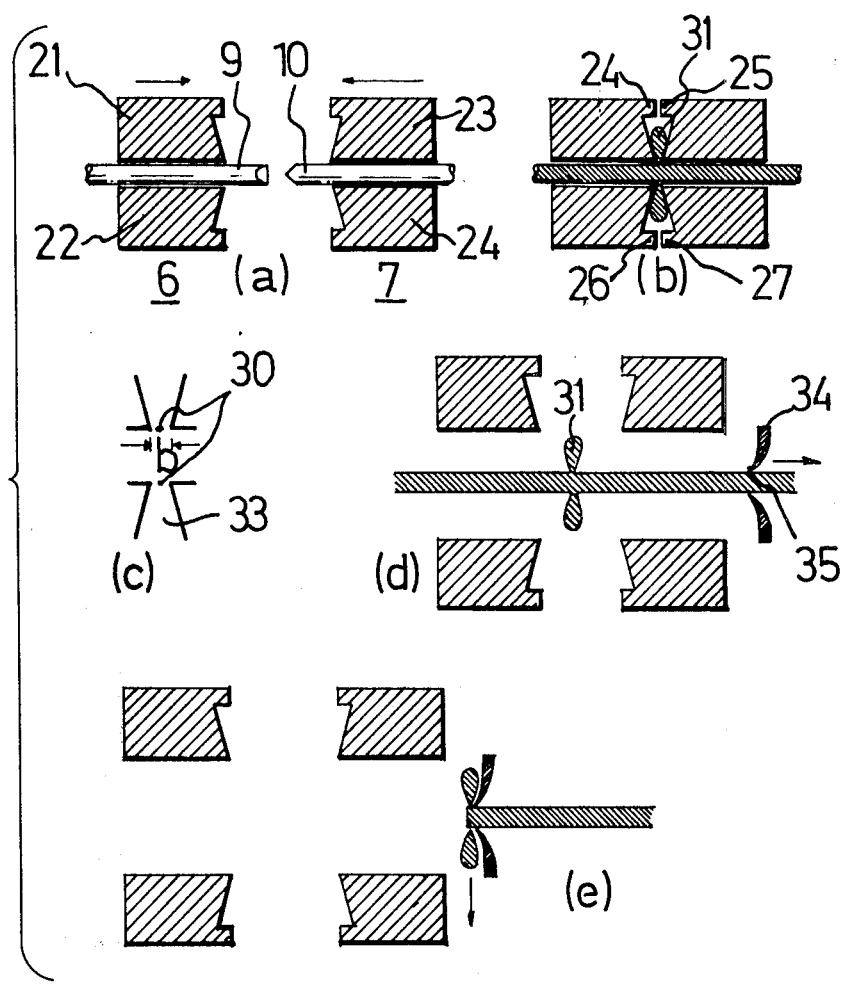
FIG. 3 shows in more detail, but still schematically, the preferred form of the grippers of FIG. 1.

The way in which the extremities 9 and 10 are pressed into each other is shown in FIGS. 2 and 3. As already mentioned, the ends 9 and 10 are cut into wedge-shaped extremities, as shown in FIG. 2. Each wedge defines a dihedral angle, comprising a pair of faces which meet along an edge 17, 18. When the ends come into contact with each other, these edges respectively are perpendicular to each other. A crossing relationship between both edges is sufficient although a perpendicular relationship is preferred. When then both ends are pushed into each other, the ends gradually penetrate into each other and rapidly and gradually find support with each other whilst the resistance of the copper material against the pressure is initially low and gradually increases, so that buckling to one side is prevented and the material is squeezed out on all sides. By so pressing, substantially all of the material at the external surface 19,20 is expelled out of the profile, or cross-sectional shape, shown in dotted lines in FIG. 2, of the aligned bar ends. Thus, the contact surface formed inside the cross-sectional surface, is formed by fresh material coming from deeper inside the bars, where the copper is not oxidised.

The simplest way to obtain both wedge-shaped ends with their edges mutually perpendicular is by using two pairs of identical shears 13 and 14 (FIG. 1), which are perpendicular relative to one another.

FIG. 3 shows, in more detail but still schematically, the preferred form for the grippers 6 and 7. They are each formed of two parts 21, 22 and 23, 24 respectively, which, when they are closed around the bar ends 9 and 10, define a cylindrical opening of the cross-sectional shape, so that they perfectly surround the bars and do not allow, under longitudinal pressure, any thickening thereof over a sufficient length, e.g. three times the average thickness of the bars, so as shown in FIG. 3 a, where the grippers are shown in their position before being pushed towards each other by the high-power system and where the bar ends protrude towards each other out of the grippers over a length of about 1.5 times the average thickness of the bars.

When then the grippers 6 and 7 are then pushed towards each other, the bar ends 9 and 10 penetrate into each other over a total length of about three times the average thickness, until the grippers come into abutment with each other as shown in FIG. 3 b. The grippers are so shaped that, in this position, they form a mould for the expelled material. When the abutting pars 24, 25 and 26, 27 come together respectively, then this mould leaves a thin annular opening 30 around the joint (see detail in FIG. 3 c) for permitting the expelled material to be squeezed out through this opening and to be pressed into a ring 31, which is connected to the weld along the annular shape 30 which forms the inner surface of the ring and the outer surface of the joint. The breadth b of thie annular shape is chosen less than half, preferably less than a quarter of the average thickness of the bars in order to allow easy separation of the ring from the joint.

Figure 4:
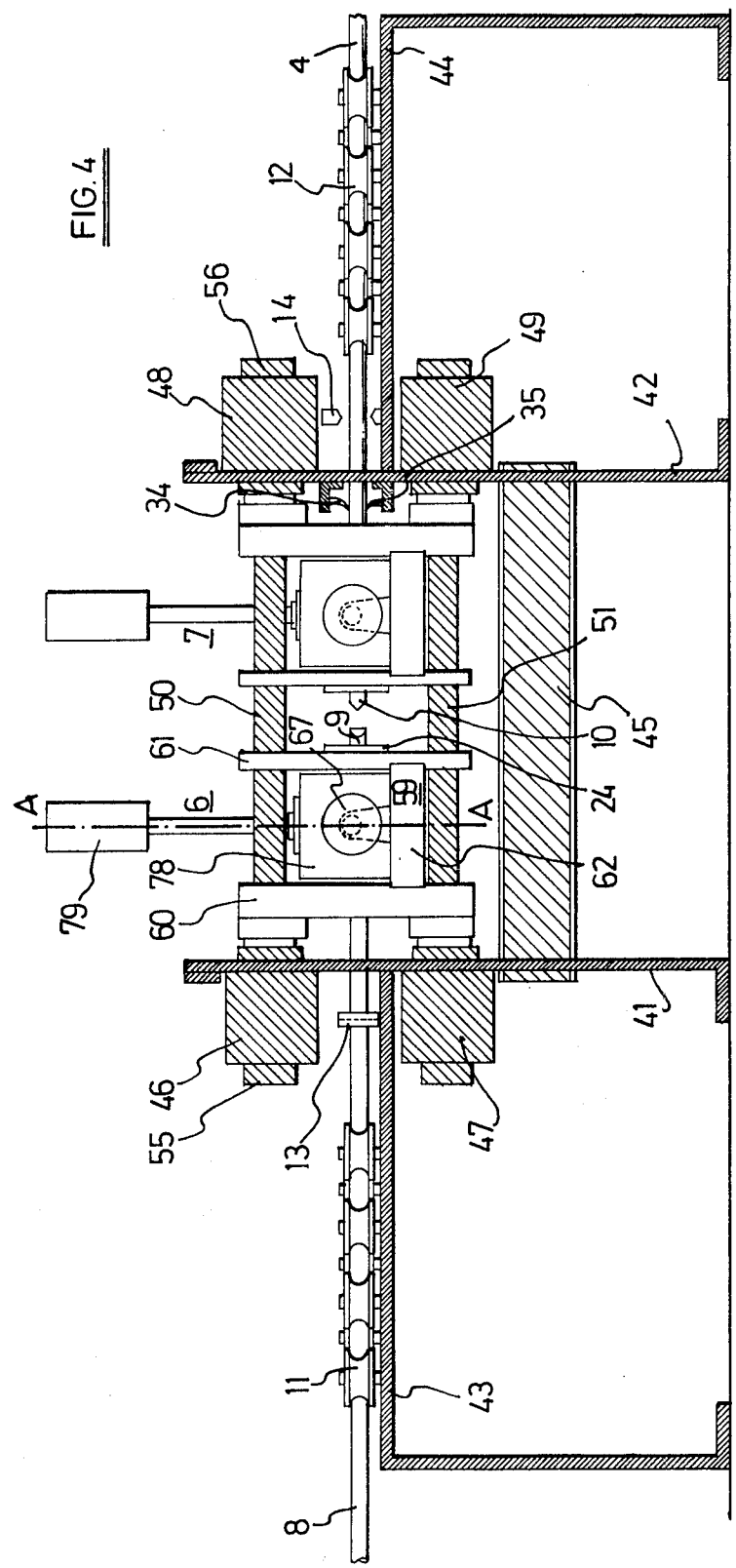
FIG. 4 shows a pressure welding apparatus for use in carrying out the method according to the invention.

After the bar ends have been pressed into each other, the grippers are opened and separated again into their initial position as shown in FIG. 4 d, and the joint appears with a ring 31 around it, formed by the expelled copper. The welded string is then moved to the right by the conveying system which moves the string from the between the grippers towards the outlet of the welding apparatus and along a path which comprises a member 34 having an opening with sharp edges 35. The string passes through the opening until the ring abuts the member 34 which cuts off the ring from the welded portion of the staves. The sharp edge 35 facilitates the separation of the ring although, for breaking off the ring, it is sufficient that the opening does not allow the ring to pass or that its diameter lies between the inner and outer diameter of the ring.

It may be advisable to provide at that location a shaving operation of the whole bar surface in order to remove all scale and surface impurities before the final continuous rolling. The lost copper material is in proportion much less when the copper is shaved at high diameter, in an intermediate stage, than at low diameter at the end, because in both cases the shaving depth must be about the same.

When the string continues on its way, the ring 31 slides along the string towards its extremity, and when this extremity finally passes the opening, the ring is free to fall down as indicated in FIG. 3 (e). It is clear that this way of separating the ring from the joint is not the only possible one, and that, for instance the member 34 can be given a cutting movement relative to the string, or that the opening for breaking off the ring is formed in the grippers themselves.

FIG. 4 shows in more detail a side view of an embodiment of a pressure-welding apparatus used for the invention. Herein, the numbers 6 to 14 represent the same elements as in the schematical FIG. 1, and the fixed parts are hatched. The apparatus comprises a fixed steel frame comprising two parallel and vertical frame plates 41 and 42 to which are fixed the tables 43 and 44 respectively. Both frame plates are connected to each other, for solidity, by two horizontal parallel beams, of which the front beam is shown at 45. To frame plate 41 are mounted four pressure cylinders on the corners of a rectangle having a vertical breadth direction and a horizontal length direction perpendicular to the plane of the drawings, so that only two, 46 and 47, of these four cylinders are visible on FIG. 4. In the same way, symmetrically, disposed are four cylinders on frame plate 42, of which only 48 and 49 are visible. A fixed support cylinder 50 extends between cylinders 46 and 48 and is fixed in the bottom 55 and 56, of both cylinders respectively. Four such support cylinders, 50,51, 52 and 53, extend between the four cylinders which are fixed to support plate 41 and the four cylinders on plate 42. Of these four support cylinders, only two, 50 and 51 are visible on FIG. 4, but all four are visible on FIG. 5, which will be explained later.

The arriving bar is shown in 8, and passes through a first driving roller system 11, further between a first pair of shears 13 and further through a first gripper 6, where the leading end 9 has its extremity protruding out of the gripper towards the trailing end 10 of the string 4. This string passes from its trailing end 10, through a second gripper 7, further through a member 34 having an opening with sharp edges 35, between a second pair of shears 14, and finally through a second driving roller system 12. These driving roller systems 11 and 12 comprise a number of roller wheels between which the copper bar or string is led in the way as in straightener rollers, and driven by the wheels, which are rotated by a controlled electric motor, not shown in the drawing, one for the wheels on table 43 and another one for the wheels on table 44. The pair of shears 13 is so arranged as to move horizontally and perpendicularly to the plane of the drawing, and cuts the bar for forming a wedge-shaped extremity with a vertical edge. The pair of shears 14 is arranged to move vertically and to cut the string for forming a wedge-shaped extremity with a horizontal edge, perpendicular to the plane of the drawing. The edges 35 of the opening are at a short distance from the surface of the string, so as to cut off the copper ring formed around the joint, when this joint passes the opening.

Grippers 6 and 7 are of symmetrical construction, and for that reason, only the gripper 6 is described in detail. The latter comprises a carriage 59, which is slidable along the support cylinders 50,51, 52 and 53. This carriage is made of a thick vertical plate 60, perpendicular to the support cylinders, and a second plate 61, thinner than plate 60 and parallel with it, both plates being fixed to each other by a horizontal table 62. Both plates comprise four openings for the support cylinders 50,51, 52 and 53 and can freely slide along these cylinders. Plate 60 is connected to the four pistons of the four pressure cylinders which are fixed on frame plate 41. These pistons are hollow, for letting the support cylinders pass to the bottom, 55 and 56, of the support cylinders. In this way the carriage 59 can be moved to the right under great pressure, and back.

Figure 5:
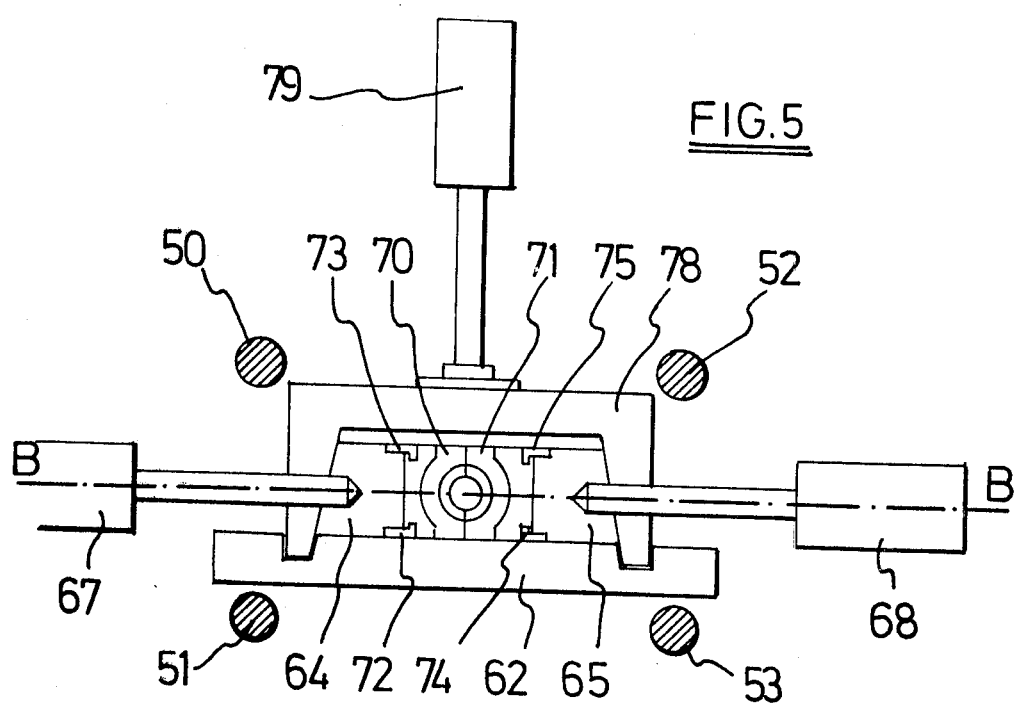
FIG. 5 is a cross-sectional view of the apparatus of FIG. 4 on the line A—A.
Figure 6:
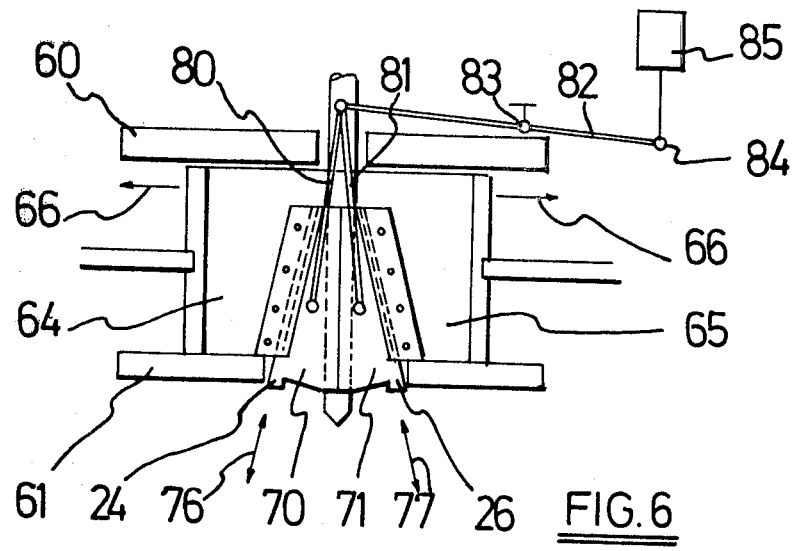
FIG. 6 is a cross-sectional view on the line B—B of FIG. 5.

On the carriage are mounted the elements which serve to clamp the bar, and which are more visible on FIG. 5, which is a cross-sectional view of the apparatus, according to line AA on FIG. 4, and on FIG. 6, which is a cross-sectional view, according to line BB of FIG. 5. This clamping system comprises a pair of symmetrically disposed clamp holders 64 and 65, which are slidable over table 62 between plates 61 and 62 in the sense of arrows 66 (FIG. 6), and which are each moved in this direction with the help of a corresponding pressure cylinder 67, 68, of which the piston is fixed to the clamp holders. In these clamp holders are mounted, symmetrically, the clamps 70 and 71, which are each slidable in the corresponding clamp holder, along a pair of guiding-rails 72,73, respectively 74, 75, in the direction of arrows 76 and 77 respectively. The guiding rails in the clamp holders are tapered in the direction which is averted from the other gripper, so that any pushing on the bar, with the clamps pressed against it under influence of the pressure of the clamp holders towards each other, also pushes the clamps in the tapering direction which makes the clamp press firmer around the bar. The opening between the clamps defines a cylinder having a diameter which is only a small percentage, about 5%, smaller than the diameter of the bar, so that inside, the clamps assume substantially the same cross-sectional shape as the bar ad firmly grip and surround the bar.

The advantage of those clamps which are slidable along directions which taper away from the other gripper is that the pressure of the clamps on the bar adapts itself according to the hardness of the bar. When the end of the bar is nearer to the melting temperature, and very soft, the grippers also take the bar under low force without danger of squeezing or otherwise damaging them, because then the bar ends are pressed into each other under low force, and so only low reaction forces work on the bars and on the clamps. When, inversely, the bar is comparatively cold so that high forces are needed to press the bar ends into each other, then comparatively higher forces are transmitted to the clamps. It is clear that a gripper having more than two clamps can be used and that the same effect will be obtained as long as they are slidable along directions which taper together in the direction away from the other gripper. The angle of tapering will preferably be about 20 degrees, but, in dependence on circumstances will be between 5 and 30 degrees with respect to longitudinal axis of the bar.

The whole of the clamp-holders 64 and 65 and clamps are, when the clamp-holders are brought together, kept closed by a clutch fork 78 which is vertically removable under command of a pressure-cylinder 79. For that reason, the clamp holders 64 and 65 have a trapezoidal cross-section in FIG. 5, tapering down in the upward direction, so that a downward pressure exerted by the clutch fork 78 firmly presses the clamp holders together. In such a way, the forces tending to push the clamp holders 64 and 65 away from each other are taken up by the fork 78, and no longer by the cylinders 67 and 68 which serve for opening and closing the clamp holders and the clamps.

By the pressure, exerted by the bar on the clamps, these clamps are pushed away from the other gripper, and consequently, when the clamp holders are opened again, it is necessary to move the clamps back to their initial position nearer to the other gripper. This is accomplished by a lever system where two levers 80 and 81, which are fixed to the clamps on top of them, are connected to one end of a third lever 82, which is pivotally fixed to the fixed frame in pivot 83, and of which the other end 84 is connected to the piston of a pressure-cylinder 85. By moving the piston, the clamps can be moved along their rails 72 to 75.

The front of the clamps 70 and 71 have such a shape, including the abutments 24 and 26, as to form, with the clamps of the other gripper 7, a mould for shaping the expelled material into a ring, as explained in conjunction with FIG. 3.

The operation of this apparatus is as follows. In its initial position, the apparatus is in the position as shown in FIGS. 4, 5 and 6, ready for welding. Then, the eight pressure cylinders, of which 46 to 49 are visible, are put under pressure, so that carriage 59 of gripper 6 is moved to the right, and the corresponding carriage of gripper 7 to the left (FIG. 5). By this movement, the clamps of both grippers come into contact with each other with the abutments 24, 26 (FIG. 6) so as to form a mould in which the copper from the pressed bar ends 9 and 10 is pressed into a ring around the joint between the grippers 6 and 7. Then the clutch fork 73 of each gripper is lifted by its corresponding pressure cylinder 79, and then cylinders 67 and 68 are commanded for opening the clamp holders, in the sense of arrow 66 in FIG. 6. At the same time, cylinder 85 is put into operation to bring both clamps forward into the direction near to the other gripper. Now both grippers 6 and 7 are in a position where they have released the string 4, and the bar 8, which is now welded to the string.

In the next step, the driving roller systems 11 and 12 are moved for conveying the thus extended string through the apparatus, whereby the ring around the joint abuts the sharp edges 35 of the cutting member 34, which cuts off the ring. The string is further conveyed through this apparatus, whilst the ring, which cannot pass the opening in member 35, slides along it until the trailing end of the string has passed the opening. Then the ring is free to fall down. In that position the direction of movement of the driving roller system 12 is reversed, until the trailing end of the string comes to standstill under the scissors 14. In the meantime, a new arriving bar has been caught by driving roller system 11 and conveyed with its leading end to standstill under the scissors 13. In this position both ends are cut off, in a wedge-shape with mutually perpendicular edges and then the driving roller systems 11 and 12 are put into motion again until the leading end 9 of the newly arriving bar 8 and the trailing end 10 of the string 4 are in the position as shown in FIG. 4. It must be remarked here that the clamps of the grippers are, in this position, far from any contact with those ends, which thus do not unneccessarily cool down before welding.

In the final step now before welding, each of the grippers are closed around the ends 9 and 10 in the following way. Firstly, cylinders 67 and 68 are operated to bring both clamp holders nearer to each other, in the sense contrary to arrows 66 (FIG. 6) until the clamps 70 and 71 surround the bar end, which then protrude out of the clamps by a length of about one and half times the diameter of the bars. Then the clutch fork 78 is moved downward over the clamp holders, and the whole apparatus is again in its initial position, ready for the next welding cycle.

As a starting material conventional copper wire bars of the abovementioned usual dimensions can be used, which are shipped from the copper refineries. But nothing prevents to provide in the in-line operation, upstream the discontinuous hot rolling mill, an operation where the wire-bars, of other more convenient dimensions and compositions are discontinuously cast. This has the advantage that these wire-bars can be left to a solidify and cool down to hot-rolling temperature, and then at that temperature be supplied to the discontinuous rolling mill. In this way the heat for obtaining the hot rolling temperature at that temperature is, without any supplemental heating, obtained directly from the necessary heat for casting.

What is claimed is:

1. In a process for continuously producing copper wire rods in an on-line plant, which process comprises the steps of passing a number of wire bars at hot rolling temperature one by one through a rolling mill for delivering one after another a number of copper bars, butt welding under pressure the leading end of each copper bar leaving said rolling mill to the trailing end of a continuous string formed by the preceding bars which are already welded to each other, removing at the weld the material which projects beyond the contour of the string, and continuously rolling said continuous string through a continuous rolling mill into wire rods, the improvement which comprises using a welding step in which both ends to be welded have a wedge-shape and are pressed together with the edges of the wedges in crossing relationship, the interface being below melting temperature, and the pressing being conducted in one single pressing step.

2. A process according to claim 1 in which said temperature is between the melting temperature and 250° C. below the melting temperature.

3. A process according to claim 1 in which said temperature is between 100° and 300° C. below the melting temperature.

4. A process according to claim 1 in which both ends are rendered wedge-shaped by cutting off a piece of the end of each bar by means of a pair of shears of appropriate form to leave a wedge-shaped end.

5. A process according to claim 4 in which the two opposite surfaces of the bars with which the edges of the shears come into contact are previously descaled.

6. A process according to claim 5 in which said descaling is carried out by milling away a part of said surface.

7. A process according to claim 1 in which both ends are made to penetrate into each other with the edges of the wedges substantially perpendicular to one another.

8. A process according to claim 1 in which the surface material of both contacting wedges is expelled in the form of a ring connected to the weld along an annular inner surface part having a breadth of less than half the average thickness of the bars.

9. A process according to claim 8 in which said ring is removed from around the weld by passing the welded portion through a hole having a diameter between the inner and outer diameter of the ring.

10. A process according to claim 1 in which said continuous string is shaved before continuous rolling.

11. A process according to claim 1 in which said copper bars after rolling and before welding are kept in a furnace which is maintained at a constant temperature in the range between melting temperature of the bars and 200° below such melting temperature and for a sufficient time to allow said bars substantially to assume said constant temperature.

12. A process according to claim 1 for continuously producing copper wire rods in an in-line plant, comprising casting a number of wire bars and allowing these to solidify and to cool down to rolling temperature and using said wire bars at said rolling temperature as starting material for said process.

* * * * *